Patented June 29, 1937

2,085,534

UNITED STATES PATENT OFFICE 2,085,534

SOAP FOR MANUFACTURING LUBRICATING GREASES

Edwin N. Klemgard, Martinez, Calif., assignor to Shell Development Company, San Francisco, Calif., a corporation of Delaware No Drawing. Application February 20, 1935, Serial No. 7,379

4 Claims. (Cl. 87—9)

This invention relates to metallic soaps such as are used in the manufacturing of lubricating greases, and pertains more particularly to the preparation of a soap composition containing a relatively small quantity of natural rubber from latex as one of its components.

In my Patents 1,979,943 and 1,975,582 I have disclosed that the stability and other desirable qualities of lubricating greases, especially those adapted for use under conditions of extreme pressure, can be considerably improved by the addition to said greases of small quantities of natural rubber from latex. The effect of such rubber consists in retarding, and in many cases in practically totally precluding the tendency of the lubricating mixtures to separate into their component parts in use or during periods of storage.

In said patents I have also disclosed the various ways in which lubricating greases can be prepared according to my invention.

Thus, in preparing, for example, soda and lime base greases, the soap is placed first in a compounding kettle, and the oil is gradually added thereto, if desired, with heating and agitation. In some cases, as with aluminum base greases, it is preferable to reverse the procedure, and first place the oil in the compounding kettle, the soap being gradually added thereafter. When a homogeneous product is obtained, rubber latex in liquid form is added thereto, and the mixture heated with agitation until substantially all the water contained in the latex is evaporated. In some cases, however, it may be preferable to heat the soap and oil mixture only prior to the addition of the liquid latex. The mixture is then cooled, and rubber latex admixed under such conditions of temperature that substantially no dehydration of latex occurs. Since the latex is added in relatively small quantities, the amount of water it contains does not affect unfavorably the lubricating properties of the grease, but on the contrary serves to improve them.

Rubber latex is a milky liquid consisting mainly of very minute rubber globules dispersed in a watery fluid. This dispersion is of a highly homogeneous character, as differentiated from solutions holding vulcanized rubber redissolved in a suitable medium. The latex contains, besides water and rubber, minute but effective quantities of various constituents such as proteins and resinous materials, as well as anti-coagulants such as ammonia. Latex containing from 30 to 50% by weight of rubber hydrocarbons is preferably used in this invention, although stronger or weaker natural aqueous dispersions of natural rubber may be employed.

I have now found that it is sometimes highly advantageous to incorporate the natural rubber from latex not into an already compounded grease, but into the dry soap forming the base of such grease before the soap is mixed with the oil in the compounding kettle. In this way it is possible to obtain a rubber-containing soap which may be conveniently supplied to grease manufacturers and used for the preparation of lubricating greases of any desired specification.

It is, therefore, the object of this invention to provide rubber-containing soaps to be used as bases for lubricating greases. The materials used in preparing such soaps, and the operating conditions under which the natural rubber from latex is incorporated thereinto will be understood from the following description.

In practicing my invention, I use as one of the soap-forming components any suitable material capable of supplying the acid radical of the soap, such as carboxylic acids, naphthenic acids, fatty acids obtained by oxidizing paraffin wax, non-volatile fatty acids such as stearic, palmitic, oleic acids, etc., obtained from animal or vegetable oils and fats, such as tallow, tallow oil, bone-grease, rosin, cocoanut oil, palm oil, cottonseed oil, corn oil, etc.

After duly conditioning this material and purifying it, if desired, by settling and filtering, it is reacted with a second soap-forming material of a basic character, such as caustic soda or potash, the hydroxides or salts of other suitable metals, such as calcium, aluminum, zinc, copper, iron, lead, etc. or non-metallic bases as ammonia, triethanolamine, etc. During the ensuing soap-forming reaction, the rubber latex may be incorporated into the mixture, being either directly added thereto, or introduced in admixture with one of the soap-forming components, for example, with a basic component, such as sodium hydroxide.

The globules of natural rubber contained in the latex are uniformly distributed throughout the soap-forming mixture by mechanical agitation or similar means, and when the soap is "grained" or "salted out" of the solution, by the addition of a brine, such as an aqueous sodium chloride solution, the soap particles are precipitated together with the rubber of latex deposited on them, so that a homogeneous product is obtained.

If a glyceride such as tallow, is used as the first soap-forming component, and glycerine is formed during the process, it may be separated as a by-product, or may be left in the soap. I have found that in some cases the presence of glycerine serves to improve the qualities of the lubricating greases ultimately manufactured from the soap of this invention. Also, hydroxy, or chlorinated, or sulfuretted, i. e., substituted soap-forming acids or fatty materials may be used together with or instead of the unsubstituted compounds disclosed hereinbefore.

It is well known that in manufacturing the soaps of some metals, such as aluminum, which are not capable of saponifying fats, it is customary to saponify the fatty material first with a water-soluble hydroxide, such as caustic soda or potash. The colloidal solution of the alkali soap is then contacted with a water-soluble compound of the desired metallic element, for example, with an aluminum sulfate solution, the aluminum displacing the sodium and forming an aluminum soap. In such cases, the procedure described above may be modified in that regard that the first of the soap-forming components, namely, the material containing the acid radicals, is mixed with the second soap-forming component, namely, caustic soda or potash, and the liquid latex is added to the mixture containing soap.

The resultant mixture is then contacted with, for example, aluminum sulfate, and aluminum stearate, aluminum palmitate, aluminum oleate, or their mixtures, depending on the character of the original acid-radical-containing material, is precipitated from the aqueous mixture of sodium or potassium stearate and alum. Colloidal rubber from the latex is deposited on the precipitated soap in a manner similar to the one described above. The solution of sodium or potassium sulfate may be separated from the soap in any convenient manner.

The quantities in which the latex is added depend on the properties desired in the final product, but generally a relatively small quantity, such as up to about 10% is sufficient, although greater quantities of latex may be used. Mechanical agitation may be provided to ensure a thorough mixing, and the process is usually carried at a relatively elevated temperature. Care should, however, be taken not to exceed certain limits, since too high a temperature would tend to destroy some of the essential natural properties of the rubber latex and drive off some of its useful natural components mentioned above. I prefer, therefore, to use temperatures not above 220° F.

From the foregoing, it will be understood that the step of incorporating rubber into a soap composition may be conveniently taken at various stages of the process of manufacturing soap, without departing from the spirit of this invention, so long as a homogeneous dispersion of rubber particles in the resulting soap is obtained. Thus, for example, I may prepare an entirely finished soap by conventional methods, processing it through the usual solidifying and drying stages. This soap may then be transformed into a finely granulated mass by trituration, grinding or similar processes. Comminution may be carried to a very high degree producing, if desired, a material having the character of a fine powder. This finely divided soap is then sprayed with latex, which may be forced through suitable spraying nozzles in the form of finely pulverized streams. Compressed air may be used for this purpose.

In order to obtain a thorough and homogeneous mixture of soap with latex, it is desirable to maintain the soap in a state of agitation; mechanical stirrers may be used for this purpose, or an inert dry gas be blown through the mass being sprayed. In this manner, the colloidal particles of rubber are uniformly deposited on the dry soap granules. Ordinarily, it is sufficient to spray the soap with about 4 to 10% by weight of the latex, although smaller or larger amounts may be used in some cases. I have found that the best results are obtained if the mixing is effected at a relatively elevated temperature, which should not, however, exceed the range given above; the application of heat serves to drive off the water from the moist soap obtained during the spraying process; the blowing of warm air through the mass of soap being sprayed may be effective to accomplish this. The dried product has good storage properties, does not tend to pack or form hard lumps unless the quantities of rubber used are excessive. Its rubber content may vary from less than 1% to about 5% or more, and its moisture content preferably should not exceed 3%.

The product obtained may be readily used for the manufacturing of superior lubricating greases. For this purpose, the rubber-containing soap may be mixed, for example, with a naphthenic base pale oil of about 300 sec. Saybolt viscosity at 100° F., or any other suitable viscous oil of naphthenic of paraffinic nature. The mixing may be effected by any accepted conventional method: for example, the mixture of oil and soap may be heated with agitation to about 220° F., when naphthenic base oils are used, in order to dissolve the soap and obtain a satisfactory yield of a transparent homogenous material. If, however, the percentage of the rubber-containing soap is above about 15%, or if the oil is of a paraffinic nature, a somewhat higher mixing temperature may be necessary. When a satisfactory homogeneous material is obtained, further heating is discontinued, and the grease cooled to a suitably low temperature, either before or after being discharged from the mixer.

Depending on the kind of grease which it is desired to manufacture, the amounts of the ingredients used in this process may vary between relatively wide limits, starting with less than about 1% of rubber-containing soap, and ending with about 60% of such soap. In all cases, however, the product obtained is a lubricating grease of semi-solid consistency, containing as its three essential ingredients a mineral oil, a soap, and natural rubber from latex.

As stated above, through the addition of the latter substance a very stable gel structure is formed, which is very resistant to separation usually caused by mechanical working or agitation, the stability of the product making it eminently suitable for use as lubricant for gears, wheels, ball and roller bearings and shackle bolts.

I claim as my invention:

1. A rubberized soap of low moisture content consisting essentially of a predominant amount of soap and a small quantity of natural uncoagulated rubber from latex uniformly distributed therethrough.

2. A rubberized soap of low moisture content consisting essentially of a predominant amount of inorganic soap and a small quantity of natural uncoagulated rubber from latex uniformly distributed therethrough.

3. A rubberized soap of low moisture content consisting essentially of a predominant amount of organic soap and a small quantity of natural uncoagulated rubber from latex uniformly distributed therethrough.

4. A rubberized soap of a moisture content less than 3%, consisting essentially of a predominant amount of soap and less than 5% of natural uncoagulated rubber from latex uniformly distributed therethrough.

EDWIN N. KLEMGARD.